(12) United States Patent
Ebrahimi Afrouzi

(10) Patent No.: US 9,970,770 B1
(45) Date of Patent: May 15, 2018

(54) METHOD FOR TRACKING MOVEMENT OF A MOBILE ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 0 days. days.

(21) Appl. No.: 15/425,130

(22) Filed: Feb. 6, 2017

Related U.S. Application Data

(60) Provisional application No. 62/299,701, filed on Feb. 25, 2016.

(51) Int. Cl.
*G01B 11/26* (2006.01)
*G01C 21/20* (2006.01)

(52) U.S. Cl.
CPC .............. *G01C 21/20* (2013.01); *G01B 11/26* (2013.01)

(58) Field of Classification Search
CPC .................. G01C 21/20; G01B 11/26
USPC ..................................... 356/138–155
See application file for complete search history.

(56) References Cited

U.S. PATENT DOCUMENTS

| | | | |
|---|---|---|---|
| 6,240,652 B1 | 6/2001 | Bobel et al. | |
| 6,804,022 B2 | 10/2004 | Fujiwara et al. | |
| 7,145,130 B2 | 12/2006 | Sano | |
| 7,456,815 B2 | 11/2008 | Reime | |
| 8,546,745 B2 | 10/2013 | Lippuner | |

*Primary Examiner* — Tri T Ton

(57) ABSTRACT

A method for tracking movement and turning angle of a mobile robotic device using two optoelectronic sensors positioned on the underside thereof. Digital image correlation is used to analyze images captured by the optoelectronic sensors and determine the amount of offset, and thereby amount of movement of the device. Trigonometric analysis of a triangle formed by lines between the positions of the optoelectronic sensors at different intervals The offset amount at one optoelectronic sensor may be compared to the offset amount at the other optoelectronic sensor to determine turning angle of the mobile robotic device.

3 Claims, 1 Drawing Sheet

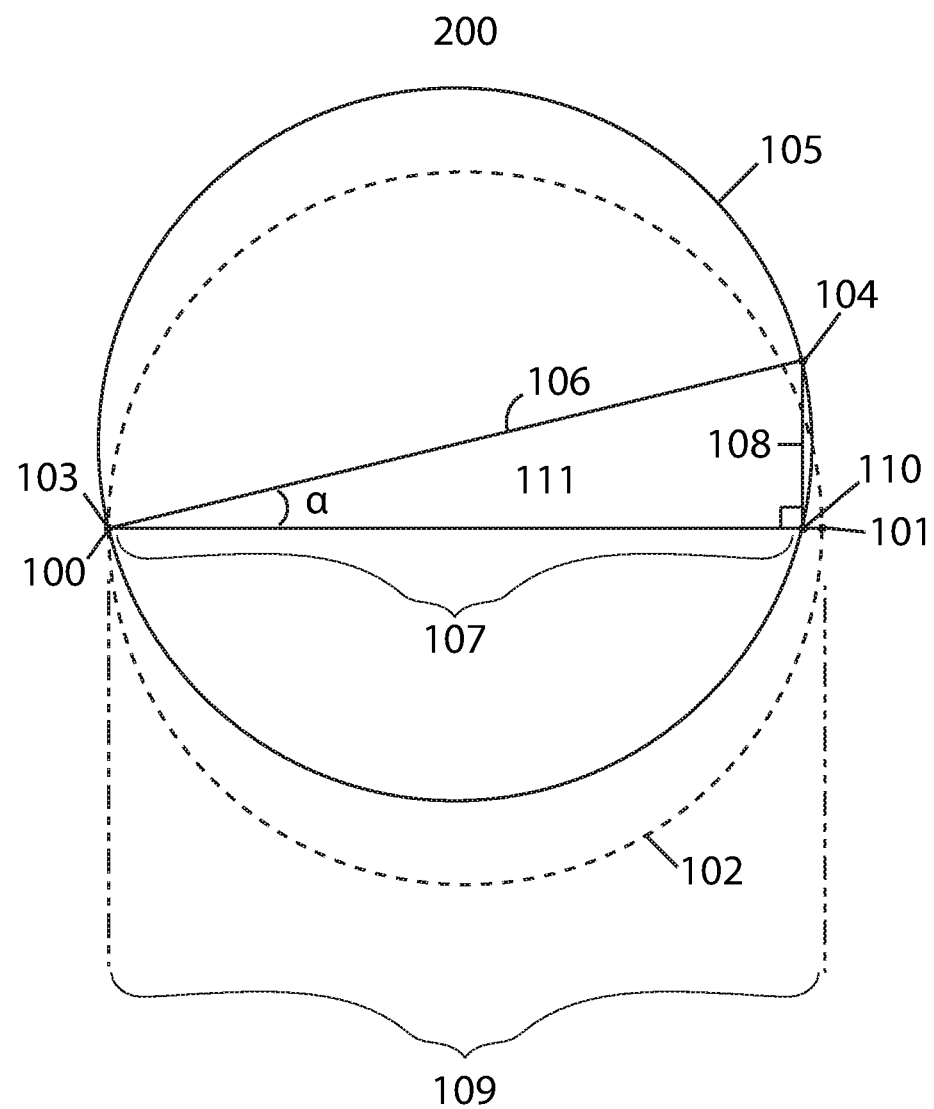

METHOD FOR TRACKING MOVEMENT OF A MOBILE ROBOTIC DEVICE

CROSS-REFERENCE TO RELATED APPLICATIONS

This application claims the benefit of the provisional patent application Ser. No. 62/299,701 filed Feb. 25, 2016 by the present inventor.

FIELD OF THE INVENTION

The present invention relates to methods for tracking movement of mobile robotic devices.

BACKGROUND

Mobile robotic devices are being used with increasing frequency to carry out routine tasks, like vacuuming, mopping, cutting grass, painting, etc. It may be useful to track the position and orientation (the movement) of a mobile robotic device so that even and thorough coverage of a surface can be ensured. Many robotic devices utilize SLAM (simultaneous localization and mapping) to determine position and orientation, however SLAM requires expensive technology that may augment the overall cost of the robotic device. Additionally, SLAM requires intensive processing which takes extra time and processing power. A need exists for a simpler method to track the relative movement of a mobile robotic device.

SUMMARY

According to the present invention, two (or more) optoelectronic sensors are positioned on the underside of a mobile robotic device to monitor the surface below the device. Successive images of the surface below the device are captured by the optoelectronic sensors and processed by an image processor using cross correlation to determine how much each successive image is offset from the last. From this, a device's relative position may be determined.

BRIEF DESCRIPTION OF THE DRAWINGS

FIG. 1 illustrates an overhead view of a mobile robotic device with two optoelectronic sensors embodying features of the present invention.

DETAILED DESCRIPTION OF THE INVENTION

The present invention proposes a method for tracking relative movement of a mobile robotic device through optoelectronic sensors.

According to the proposed invention, at least two optoelectronic sensors are positioned on the underside of a mobile robotic device such that they monitor the surface upon which the device drives. The two optoelectronic sensors should be positioned on substantially either side (one on a left side and one on a right side) of the underside of the mobile robotic device. The method uses digital image correlation to determine the amount that the robotic device has moved in both an x and y direction at the location of both optoelectronic sensors. Digital image correlation is well known in the field, so a detailed description thereof is not provided. As the mobile robotic device moves, the optoelectronic sensors capture images of the work surface and transmit them to a processor. The processor mathematically processes these images using cross correlation to calculate how much each successive image is offset from the previous one. Each optoelectronic sensor has an initial starting location that can be identified with a pair of x and y coordinates. The system can calculate a second location of each optoelectronic sensor by determining the offset amount at each optoelectronic sensor through digital image correlation. A second location of each optoelectronic sensor can be identified by a second pair of x and y coordinates.

Because the offset amounts at each optoelectronic sensor location will differ from each other if the mobile robotic device turns, it may be useful to determine the amount that the mobile robotic device turned. Referring to FIG. 1, the method for calculating this angle α is illustrated. The initial position of a mobile robotic device 200 with two optoelectronic sensors 100, 101 is shown by the dashed line 102. A secondary position of the mobile robotic device 200 with two optoelectronic sensors 103, 104 after having moved slightly is shown by the solid line 105. Because the secondary position of optoelectronic sensor 103 is substantially in the same position 100 as before the move, no difference in position of this sensor is shown. In real time, analyses of movement will occur so rapidly that a mobile robotic device will only move a small distance in between analyses and only one of the two optoelectronic sensors will have moved substantially. Throughout the remainder of this document, we will be addressing the movement of only one optoelectronic sensor, the one with the greatest amount of movement (and the only substantial amount of movement). We will assume that the other optoelectronic sensor has remained in substantially the same position.

The rotation angle of the mobile robotic device 200 can be represented by the angle α within triangle 111. Triangle 111 is formed by:
   the straight line 106 between the secondary positions of the two optoelectronic sensors 103, 104;
   the line 108 from the second position 104 of the optoelectronic sensor with the greatest change in coordinates from its initial position to its secondary position to the line 109 between the initial positions of the two optoelectronic sensors that forms a right angle therewith;
   and the line 107 from the vertex 110 formed by the intersection of line 108 with line 109 to the initial position 100 of the optoelectronic sensor with the least amount of (or no) change in coordinates from its initial position to its secondary position.

The length of side 106 is fixed because it is simply the distance between the two sensors, which does not change. The length of side 108 may be calculated by finding the difference of the y coordinates between the position of the optoelectronic sensor at position 104 and at position 101. It should be noted that the length of side 107 does not need to be known in order to find the angle α.

The trigonometric function:

$$\sin(\alpha) = \frac{\text{opposite}}{\text{hypotenuse}}$$

only requires that we know the length of sides 108 and 106. After performing the above trigonometric function, we have the angle α, which is the turning angle of the mobile robotic device.

I claim:

1. A method for tracking movement and turning angle of a mobile robotic device comprising:
   positioning two downward-facing optoelectronic sensors on substantially opposite sides of an underside of a mobile robotic device;
   monitoring a work surface upon which the mobile robotic device is working by iteratively capturing images of the work surface with the two optoelectronic sensors;
   identifying an initial position of each of the optoelectronic sensors by a first set of ordered pairs;
   transmitting the captured images to a processor, which uses cross correlation to calculate an amount each successive image is offset from a previous image;
   identifying a second position of each of the optoelectronic sensors by a second set of ordered pairs;
   determining a turning angle of the mobile robotic device by:
      using a sine function to calculate a turning angle of the mobile robotic device represented by an angle of a triangle comprised of:
         a first line between the second positions of the two optoelectronic sensors, the length of which is fixed;
         a second line from the second position of the optoelectronic sensor with the greatest amount of change in a y direction between the initial position thereof and the second position thereof to a line between the initial positions of the optoelectronic sensors that forms a right angle therewith, the length of which may be calculated by finding the difference between the y coordinates of the second position and the initial position; and,
         a third line from the point of intersection of the second line with the line between the initial positions of the optoelectronic sensors to the initial position of the optoelectronic sensor with the least amount of change in a y direction between the initial position thereof and the second position thereof.

2. A method for tracking movement of a mobile robotic floor-cleaning device comprising:
   iteratively capturing images at predetermined intervals of a surface under the mobile robotic floor-cleaning device by each of two optoelectronic sensors disposed on substantially opposite sides of an underside of a mobile robotic floor-cleaning device;
   identifying an initial position of each of the optoelectronic sensors by a first set of ordered pairs;
   processing the captured images using cross correlation to calculate an amount each successive image is offset from a previous image;
   identifying a secondary position of each of the optoelectronic sensors by a second set of ordered pairs; and,
   calculating a turning angle of the mobile robotic floor-cleaning device by finding a sine of an angle representing the mobile robotic floor-cleaning device turning angle of a triangle comprised of:
      a first line between the secondary positions of the two optoelectronic sensors, the length of which is fixed;
      a second line from the secondary position of the optoelectronic sensor with the greatest amount of change in a y direction between the initial position thereof and the secondary position thereof to a line between the initial positions of the optoelectronic sensors that forms a right angle therewith, the length of which may be calculated by finding the difference between the y coordinates of the secondary position and the initial position thereof; and,
      a third line from the point of intersection of the second line with the line between the initial positions of the optoelectronic sensors to the initial position of the optoelectronic sensor with the least amount of change in a y direction between the initial position thereof and the secondary position thereof.

3. A mobile robotic floor-cleaning device comprising:
   a chassis including a set of wheels;
   a motor to drive the wheels;
   a battery to provide power to the robotic device;
   a controller in communication with the motor and wheels, the controller including a processor operable to control the motor and wheels to steer movement of the robotic device;
   two or more optoelectronic sensors disposed on substantially opposite sides of an underside of the chassis for capturing images of surfaces underneath the chassis; and,
   an image processor for performing digital image correlation of the captured images to determine relative positions and orientation of the robotic floor-cleaning device;
   wherein orientation of the robotic floor-cleaning device is determined by finding a sine function of an angle representing a turning angle of the robotic floor-cleaning device in a triangle comprised of a first line between current positions of the two optoelectronic sensors, a second line from a current position of an optoelectronic sensor with a greatest amount of change in distance from its last position to a line between last positions of the two optoelectronic sensors, forming a right angle therewith, and a third line from the point of intersection of the second line with the line between last positions of the two optoelectronic sensors to a last position of the optoelectronic sensor with a least amount of change in distance from its last position.

* * * * *